US006337643B1

(12) United States Patent
Gabet et al.

(10) Patent No.: US 6,337,643 B1
(45) Date of Patent: Jan. 8, 2002

(54) METHOD AND DEVICE FOR GENERATING A RANDOM SIGNAL AND DIGITAL-TO-ANALOG CONVERTING SYSTEMS USING SAME

(75) Inventors: Pascal Gabet, Chaville; Jean-Luc De Gouy, Briis Sous Forges, both of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/786,349

(22) PCT Filed: Sep. 10, 1999

(86) PCT No.: PCT/FR99/02160

§ 371 Date: Mar. 12, 2001

§ 102(e) Date: Mar. 12, 2001

(87) PCT Pub. No.: WO00/16181

PCT Pub. Date: Mar. 23, 2000

(30) Foreign Application Priority Data

Sep. 11, 1998 (FR) ............................................ 98 11351

(51) Int. Cl.[7] ............................................... H03M 1/20
(52) U.S. Cl. ..................... 341/131; 341/155; 341/143; 341/144; 341/156; 341/159; 341/140; 708/3; 708/250; 708/255
(58) Field of Search ................................ 341/131, 144, 341/143, 156, 159, 140, 155; 708/3, 250, 255

(56) References Cited

U.S. PATENT DOCUMENTS

| | | | |
|---|---|---|---|
| 3,877,022 A | | 4/1975 | Lehman et al. |
| 5,483,238 A | * | 1/1996 | Norsworthy ................ 341/131 |
| 5,818,372 A | * | 10/1998 | Noro ........................... 341/131 |
| 5,889,482 A | * | 3/1999 | Zarubinsky et al. ......... 341/131 |
| 5,990,815 A | * | 11/1999 | Linder et al. ............... 341/131 |
| 5,999,114 A | * | 12/1999 | Hendricks ................... 341/131 |
| 6,070,178 A | * | 5/2000 | Anderson et al. ............ 708/3 |
| 6,247,033 B1 | * | 6/2001 | Kowalski ..................... 708/255 |

FOREIGN PATENT DOCUMENTS

EP 0 225 641 6/1987

OTHER PUBLICATIONS

Patent Abstracts of Japan, vol. 007, No. 264 (E–212), Nov. 24, 1983, JP 58 147226, Sep. 2, 1983.
Patent Abstracts of Japan, vol. 007, No. 090 (P–191), Apr. 14, 1983, JP 58 016345, Jan. 31, 1983.

* cited by examiner

Primary Examiner—Michael Tokar
Assistant Examiner—Lam T. Mai
(74) Attorney, Agent, or Firm—Oblon, Spivak, McClelland, Maier & Neustadt, P.C.

(57) ABSTRACT

A process and device for generation of a random signal, and a digital-analog conversion system using such a random signal. The process includes a first noise generation step, a second noise filtering step to obtain a signal x(t) with a predetermined spectral envelope H(f), a third step in which a non-linear function g is applied to the signal x(t) in order to give a signal y(t) similar to a predetermined amplitudes histogram f(y), the function g being defined by the following relation:

Figure 2B:
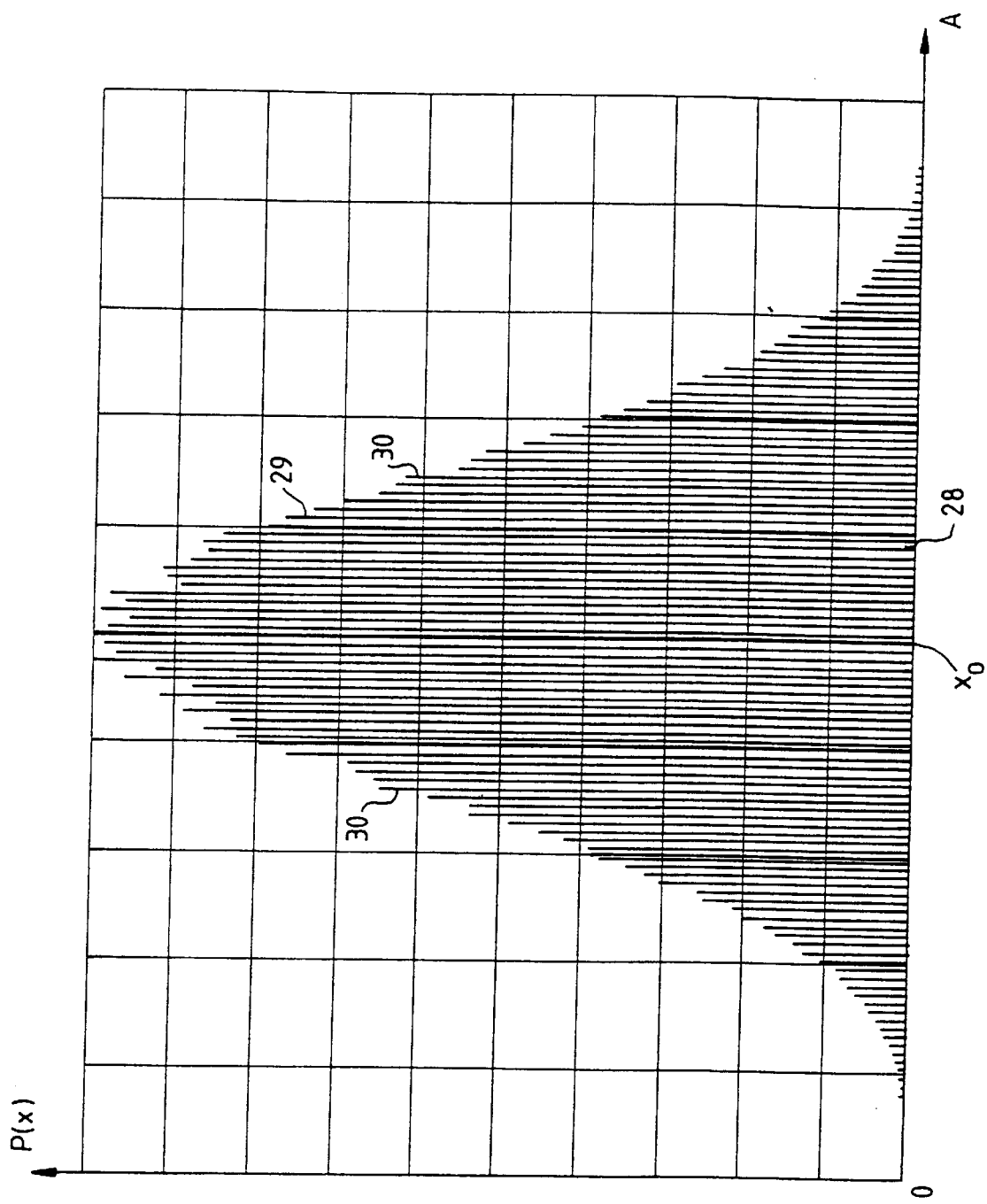

$$y = g(x) = \alpha \int_0^x \frac{P(u)}{f(u)} du$$

where the function P is the histogram of the signal x(t) to which the third step is applied, and a fourth step in which a pulse response filtering w(t) is applied to the signal y(t) to correct its spectral envelope and obtain an output signal s(t) with a predetermined spectral envelope H(f). The pulse response w(t) is the inverse Fourier transform of a frequency function W obtained by dividing the function H(f) by the modulus $Y_2(f)$ of the Fourier transform of the signal y(t). Such a process, device, and system may find particular application to a direct digital frequency synthesis, such as in radar or instrumentation applications.

18 Claims, 12 Drawing Sheets

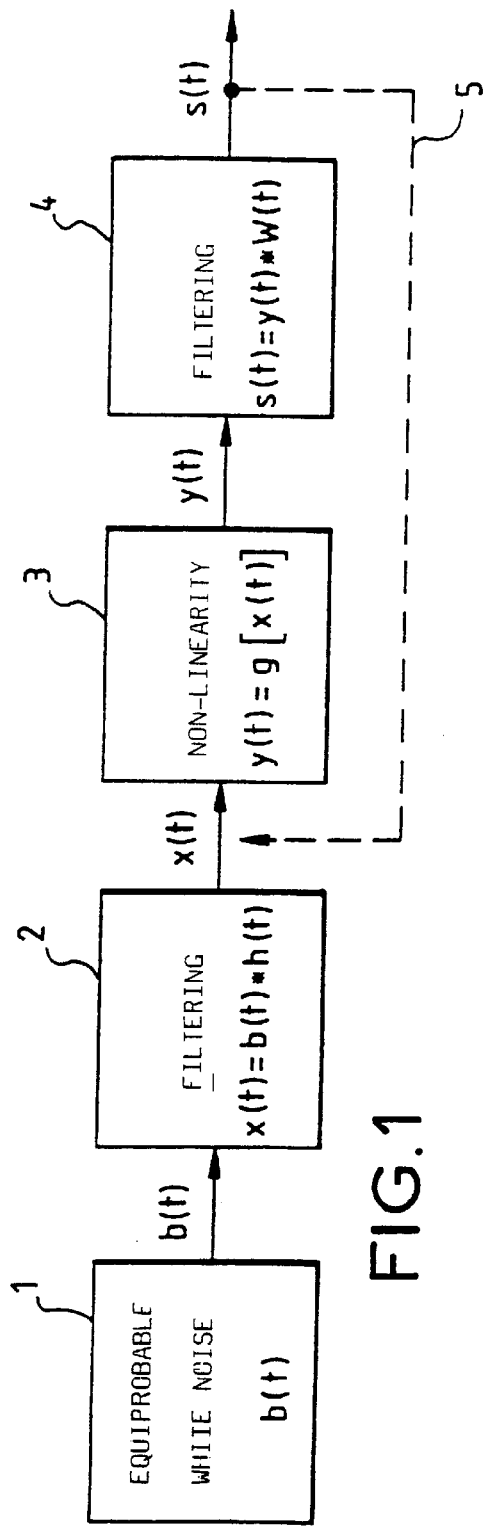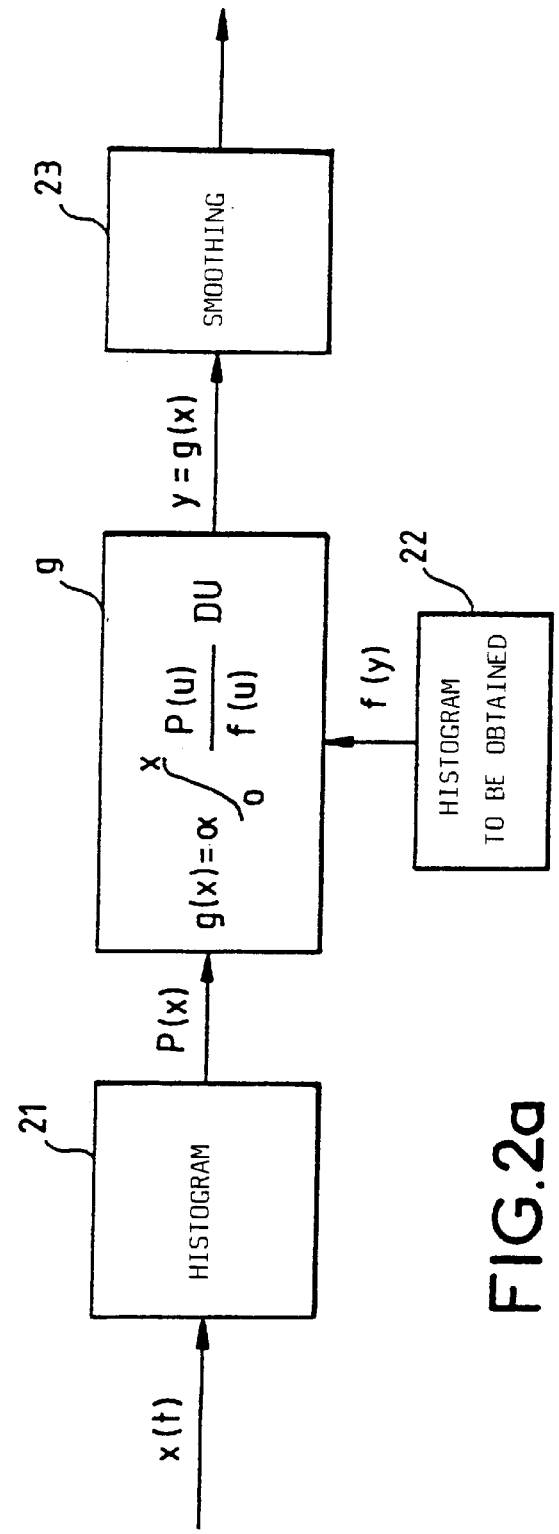

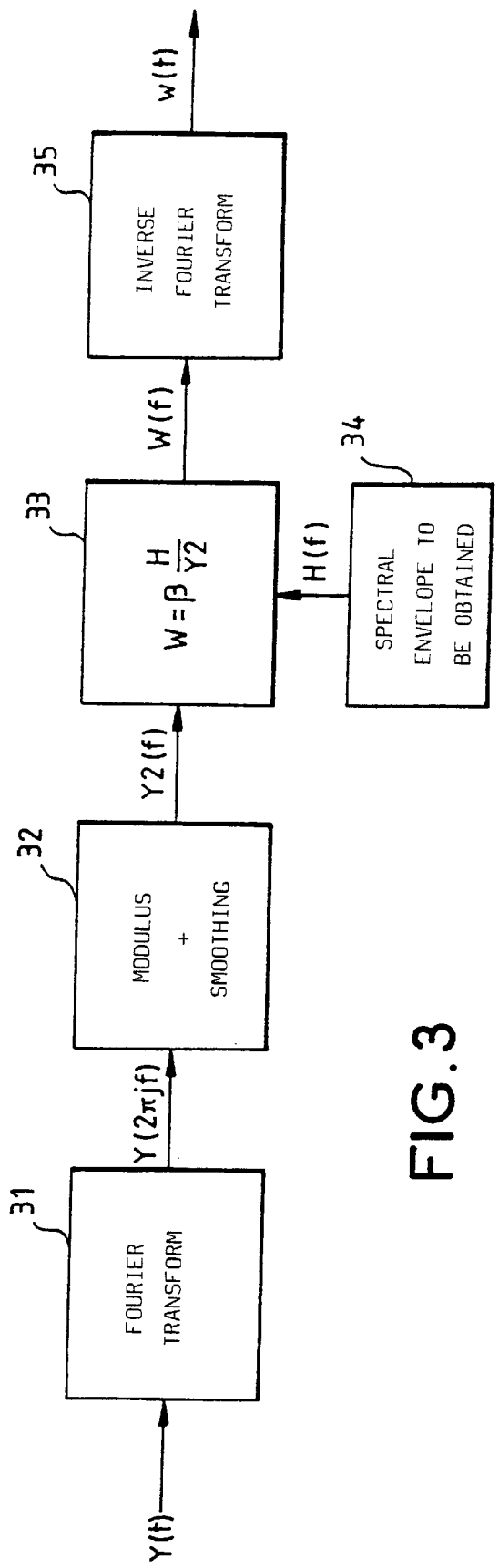
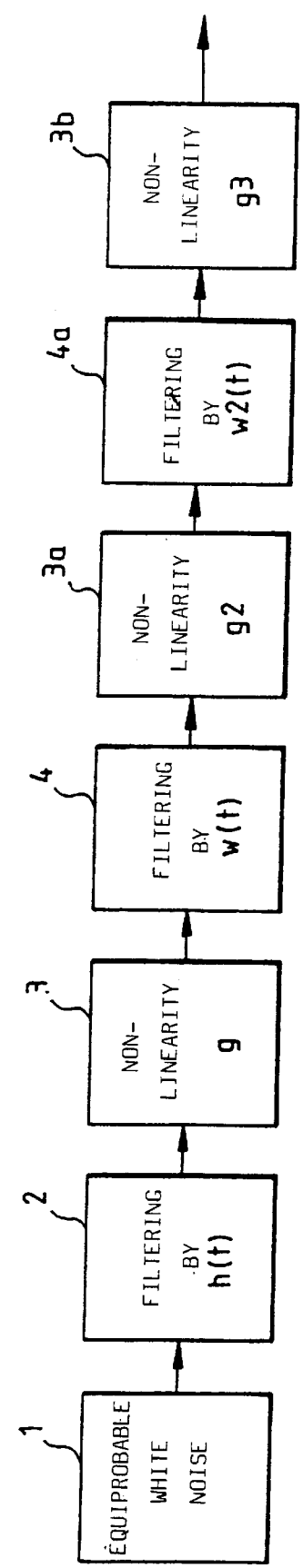
FIG.3
FIG.4

METHOD AND DEVICE FOR GENERATING A RANDOM SIGNAL AND DIGITAL-TO-ANALOG CONVERTING SYSTEMS USING SAME

This invention relates to a process and device for generation of a random signal. The invention is particularly applicable to the digital-analog conversion field and to the analog-digital conversion field. Consequently, the invention also relates to a digital-analog conversion system using such a random signal. It is applicable particularly for direct digital frequency synthesis, for example in the field of radar techniques or instrumentation.

Conversion devices (either digital-analog or analog-digital) are very widely used in many systems and their performances are usually a critical point in these systems, for example as illustrated by direct digital synthesis.

Direct digital synthesis is a frequency synthesis technique that consists of generating digital values of samples of a signal that is to be generated and converting these samples into analog signals using a digital-analog converter. Signal synthesizers made using this technique are very attractive in terms of volume, weight and energy consumption, since they can benefit from large scale integration. Their other advantages are particularly excellent resolution and very low switching times from one frequency to another. However, when a useful signal is passed through the digital-analog converter, it is accompanied by the creation of parasite signals due to non-linearities of these converters. These non-linearities are due to the fact that not all steps in the digital-analog converter transfer function are the same height and that the transition between steps produces irregular phenomena.

The same problem occurs in applications based on analog-digital converters in which the passage of signals in these converters is accompanied by the creation of parasite signals due to non-linearities.

It is known that adding a random signal to the useful signal before passing it through the converter is a means of reducing the level of parasite signals by reducing the effects of converter non-linearities mentioned above. This random signal is frequently called <<dither>>. The useful signal usually has a limited band width and the clock frequency of the system, for example a digital synthesizer, is usually greater than this band. This leaves an empty spectral space in which the random signal can be placed.

In order to be fully efficient, this random signal must have some specific characteristics. Firstly, its spectrum must be controlled so that it does not encroach the useful signals band. Secondly, the quality of the converter linearization depends on the histogram of time amplitudes of the random signal. For example, the linearization achieved using a Gaussian law is not as good as can be obtained with a rectangular law. Therefore, there is a real advantage in being able to control the spectrum and the histogram at the same time, for the random signal.

Methods are known for obtaining a random signal with a given spectral envelope. Methods are also known for obtaining a random signal with a given amplitude distribution law. In particular, these methods are described in books describing probability calculations, for example such as the book entitled: <<Simulation déterministe du hasard>> ((<<Deterministic simulation of chance>> by J. Maurin, published by Masson. However, there is no known method of creating a random signal when the spectral envelope and the amplitude distribution law are imposed simultaneously.

In particular, the purpose of the invention is to enable the construction of a random signal when the previous two parameters are imposed on it, in other words:

the spectral envelope of the signal, which is actually the modulus of the Fourier transform of its correlation function;

the time amplitude distributions law that will subsequently be called the amplitudes histogram.

Consequently, the purpose of the invention is a process for the generation of a random signal, characterized in that it comprises at least:

a first noise generation step;

a second noise filtering step to obtain a signal x(t) with a predetermined spectral envelope H(f);

a third step, in which a non-linear function g is applied to the signal x(t) in order to give a signal y(t) similar to a predetermined amplitudes histogram f(y), the function g being defined by the following relation:

$$y = g(x) = \alpha \int_0^x \frac{P(u)}{f(u)} du$$

where the function P is a histogram of the signal x(t) to which the third step is applied and α is an amplitude adjustment factor that depends on the required amplitude for the signal y(t);

a fourth step in which a pulse response filter w(t) is applied to the signal y(t) to correct its spectral envelope and obtain an output signal s(t) with a predetermined spectral envelope H(f), the pulse response w(t) being the inverse Fourier transform of a frequency function W obtained by dividing the function H(f) by the modulus $Y_2(f)$ of the Fourier transform of the signal y(t), and then multiplying by a constant β.

Another purpose of the invention is a device for making use of the above-mentioned process and a digital-analog conversion system using a random signal generated according to this process.

The main advantages of the invention are that it improves the linearity of analog-digital and digital-analog converters, that it can be applied to many systems, and is economic and easy to use.

Figure 2C:
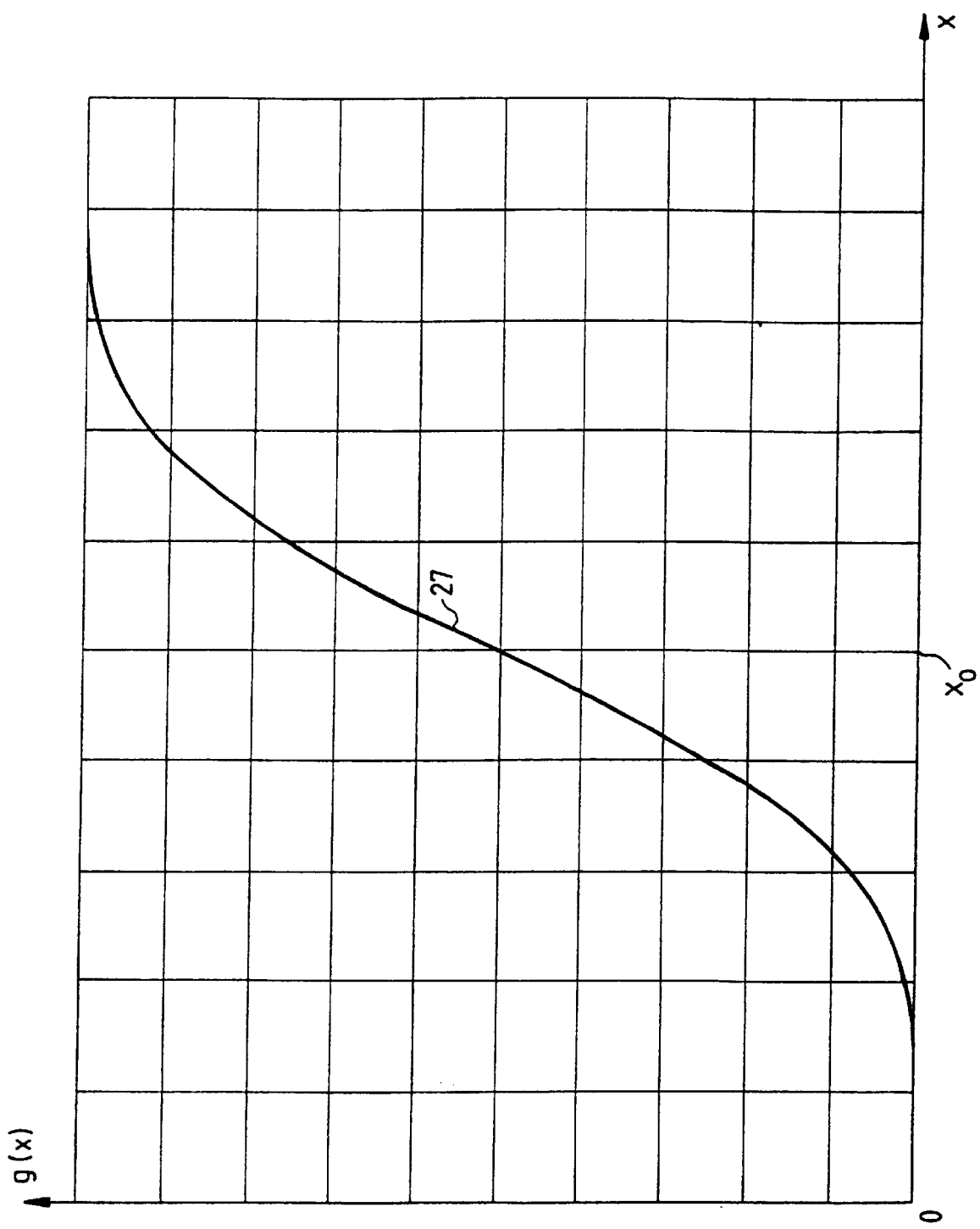
Figure 2D:
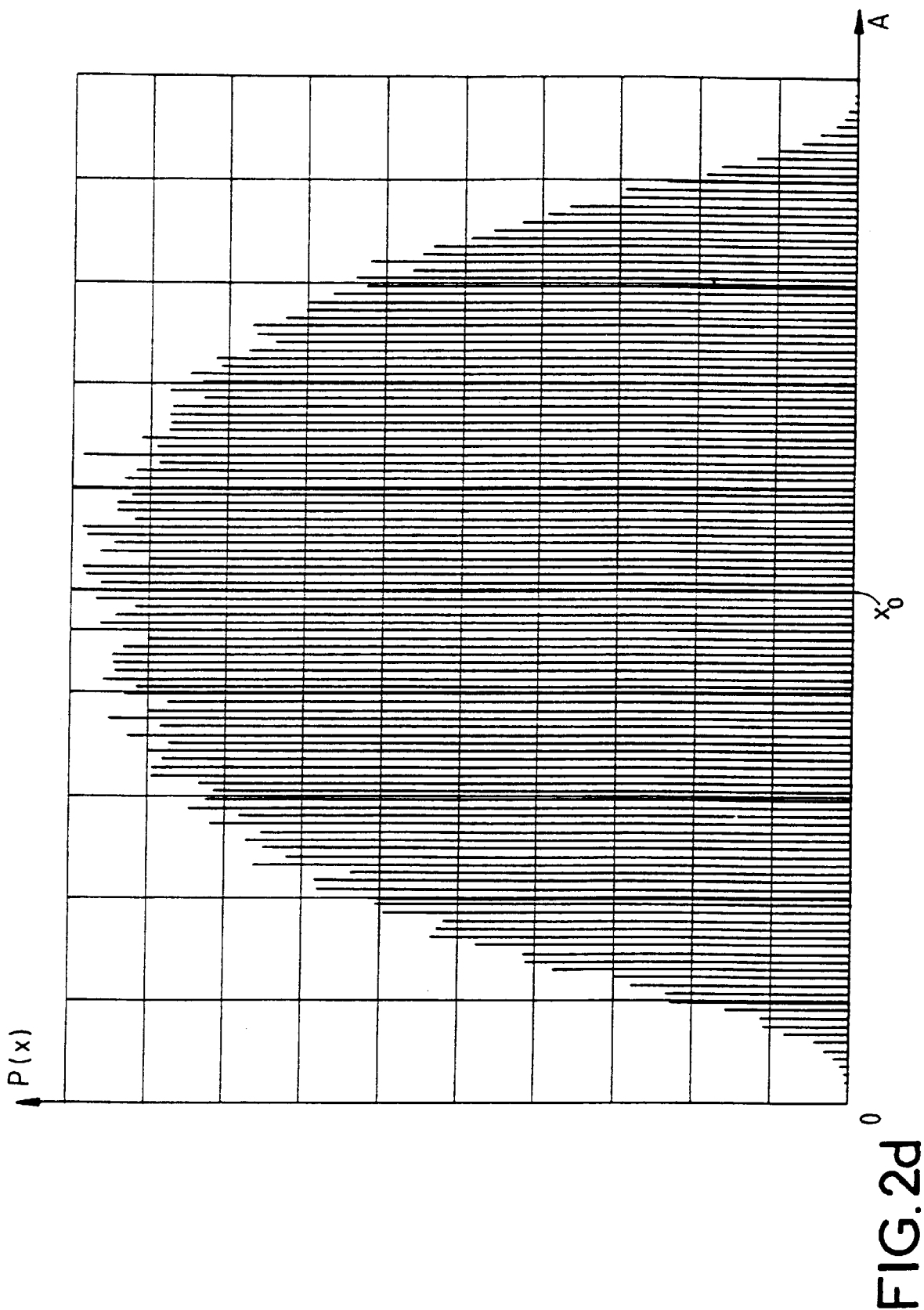
Figure 2E:
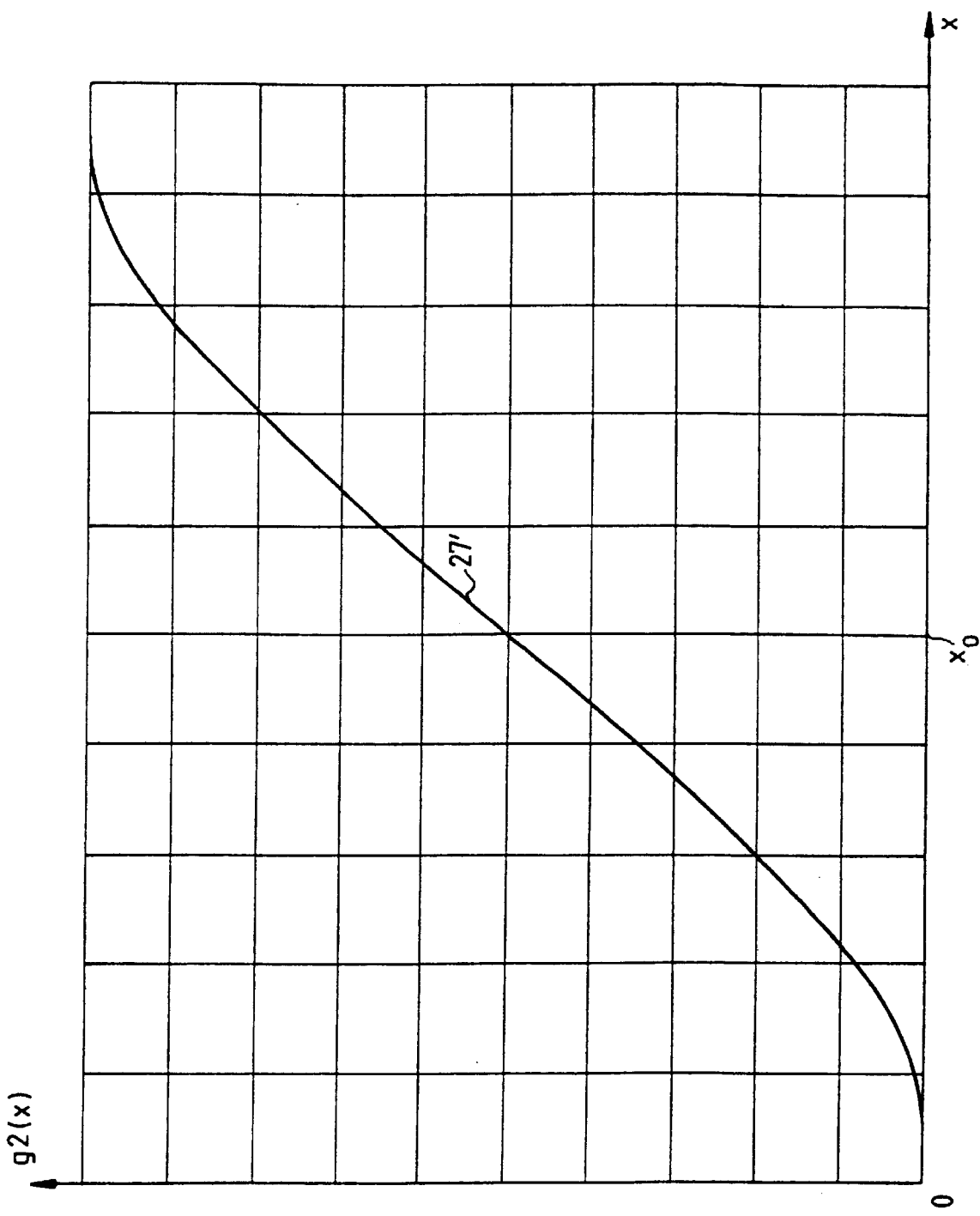
Figure 2F:
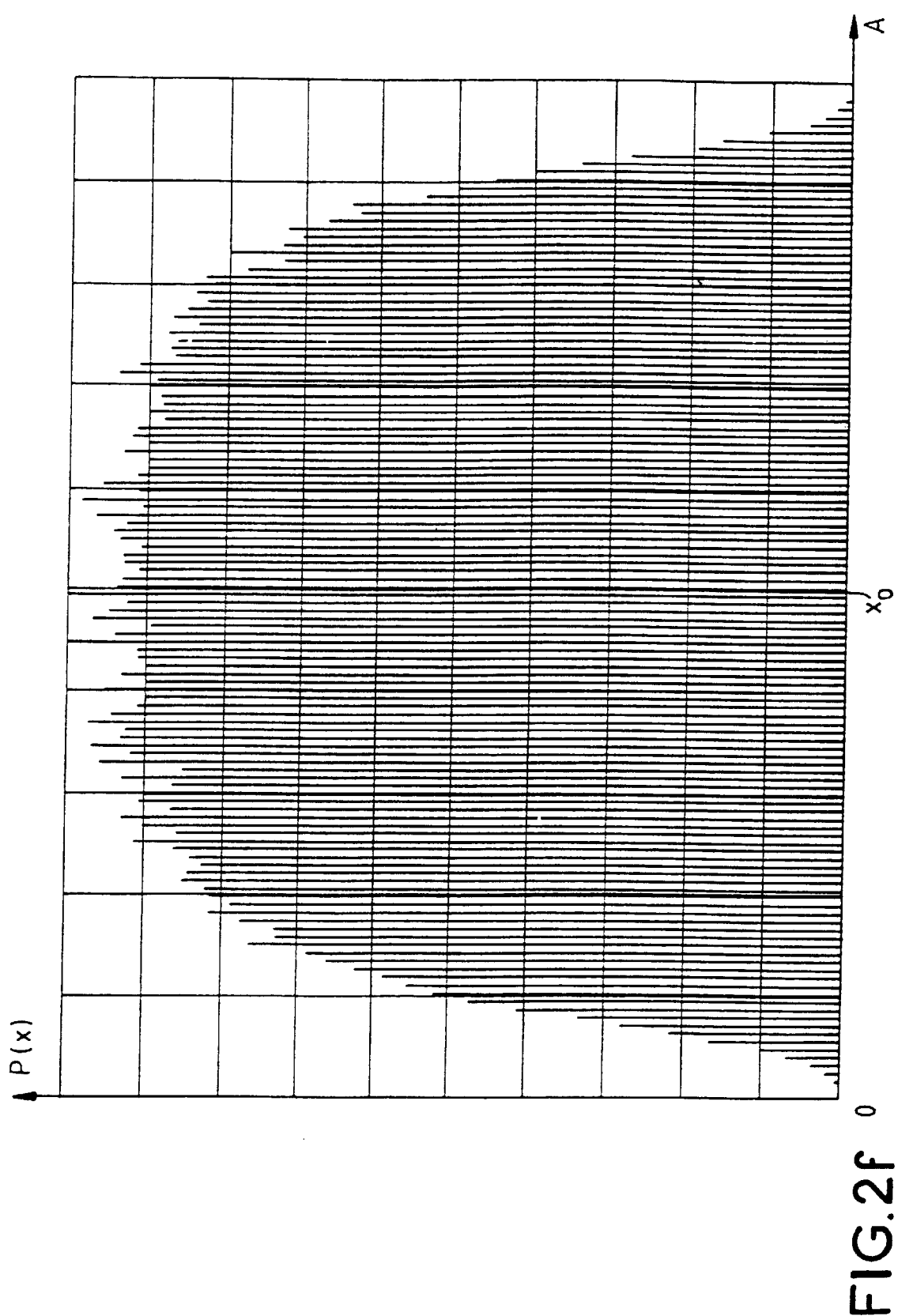
Figure 5:
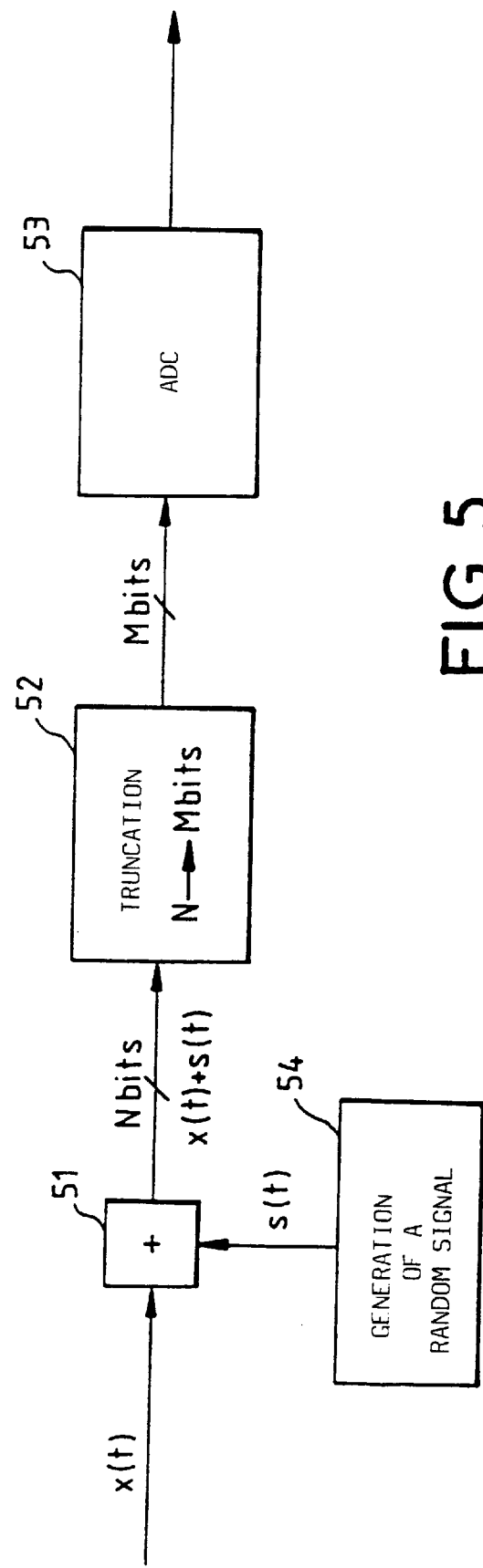
Figure 6A:
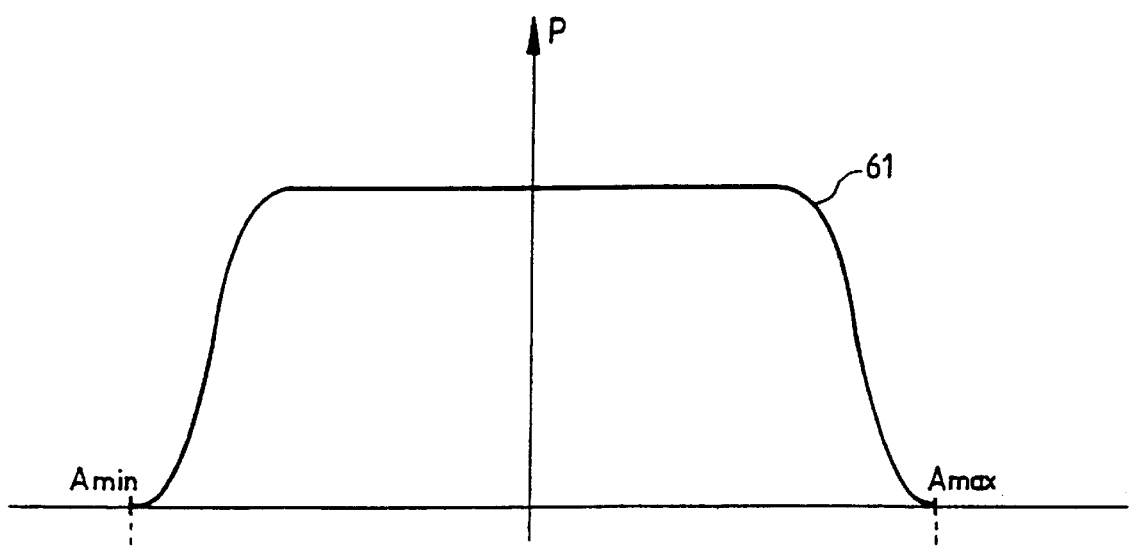
Figure 6B:
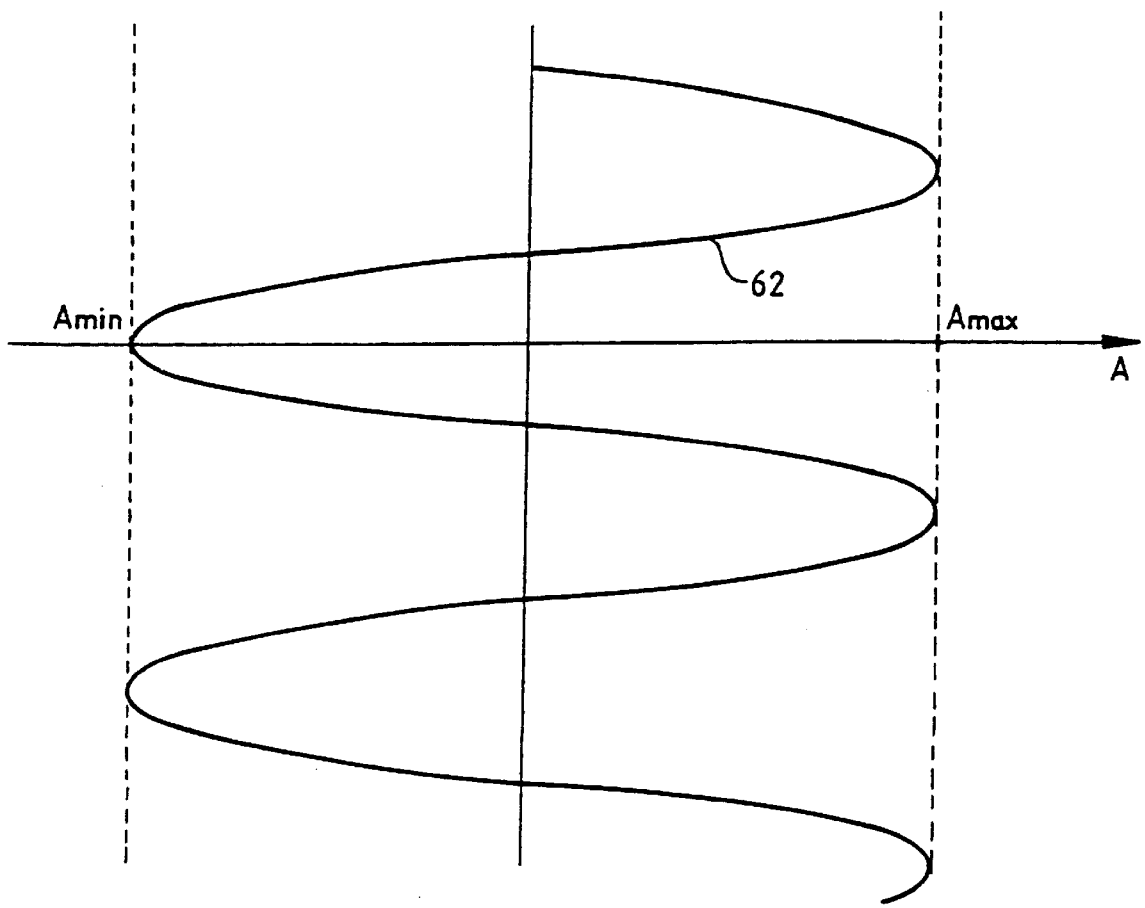
Figure 7:
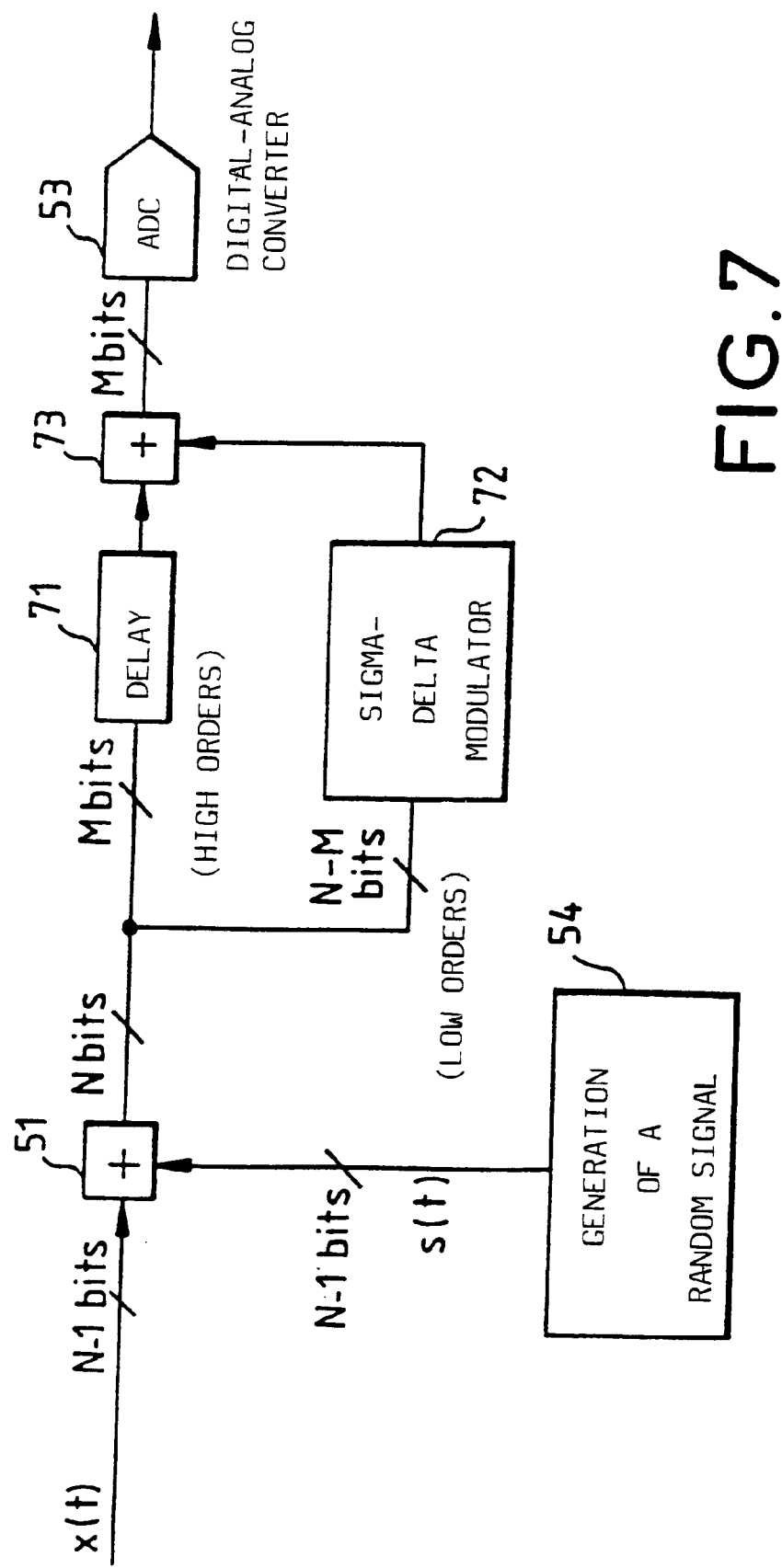
Figure 8:
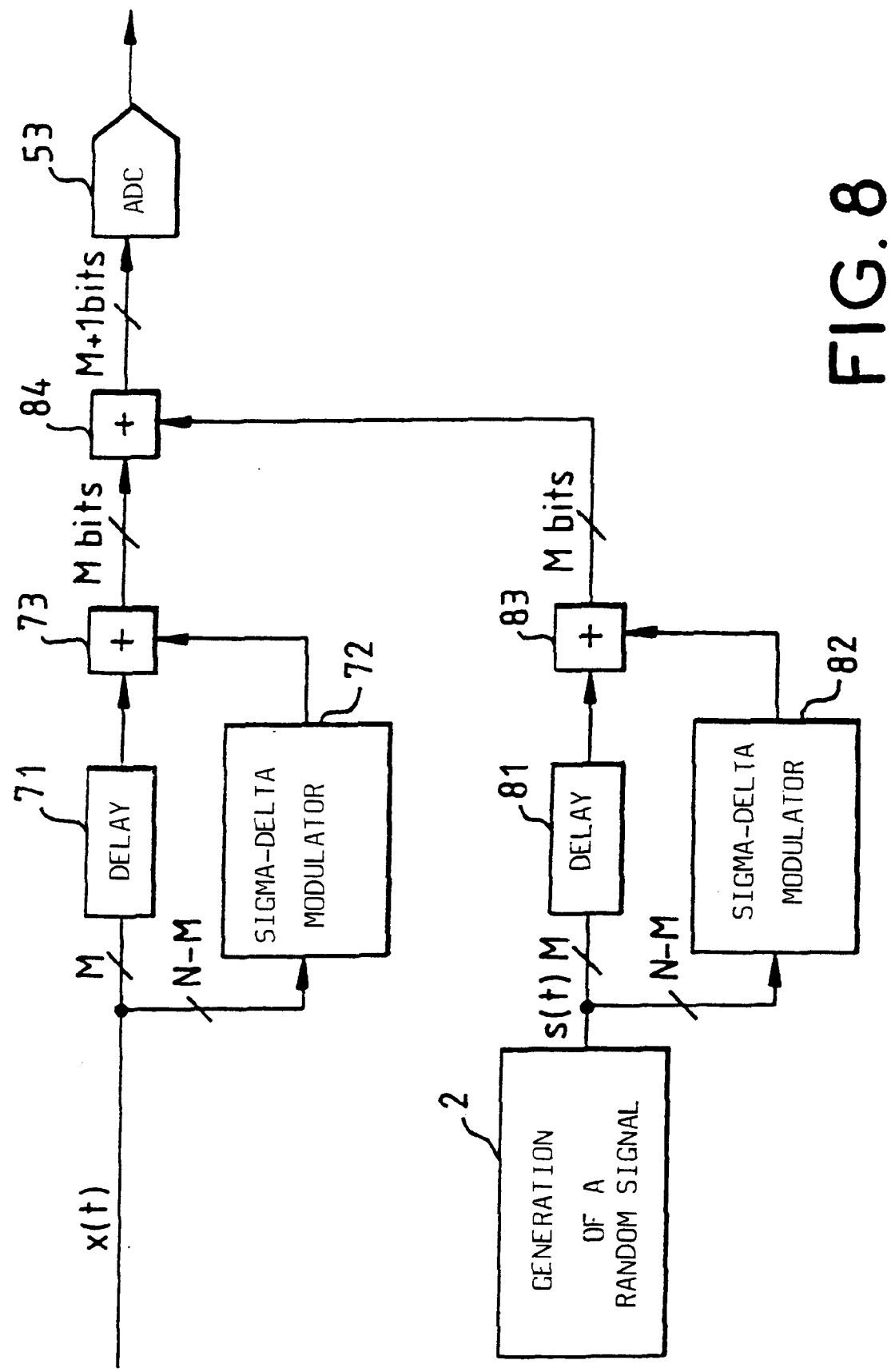
Figure 9:
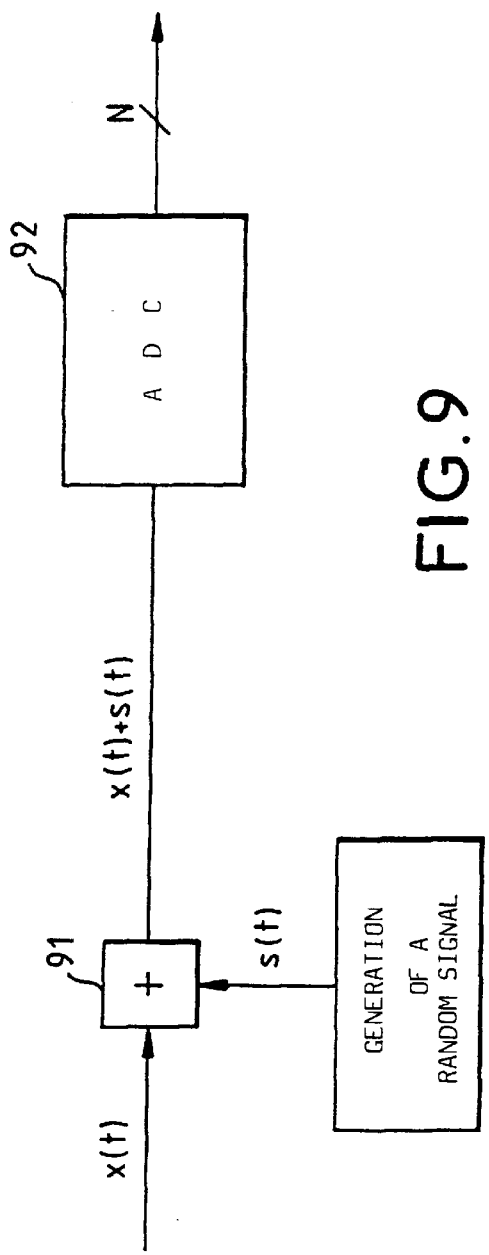

Other characteristics and advantages of the invention will become obvious by reading the following description, made with reference to the attached drawings that represent:

FIG. 1, an illustration of the main possible steps in the process according to the invention;

FIG. 2a, an illustration of a third possible step in the process according to the invention;

FIG. 2b, an output histogram produced in the second step of the process according to the invention;

FIG. 2d, an output histogram produced in the fourth step of the process according to the invention, after application of a non-linear function and filtering;

FIG. 2f, a histogram output from the previous fourth step after reinjecting the output signal from this step to the input of the third step;

FIGS. 2c and 2e, illustrations of the above mentioned non-linear function as a function of the above mentioned histograms;

FIG. 3, an illustration of a fourth possible step in the process according to the invention;

FIG. 4, a sequence of possible steps in the process according to the invention, repeating the above-mentioned third and fourth steps;

FIG. 5, a possible embodiment of a digital-analog conversion system using a random signal generated according to the invention;

FIG. 6a, an example histogram of amplitudes of a generated random signal;

FIG. 6b, an example of a useful signal with an amplitude similar to the above-mentioned random signal;

FIG. 7, a possible embodiment of a digital-analog conversion system using a random signal generated according to the invention, also deleting truncation errors in the useful signals band;

FIG. 8, a variant embodiment of the system according to FIG. 7;

FIG. 9, an example of an analog-digital conversion system using a random signal generated according to the invention.

Figure 10:
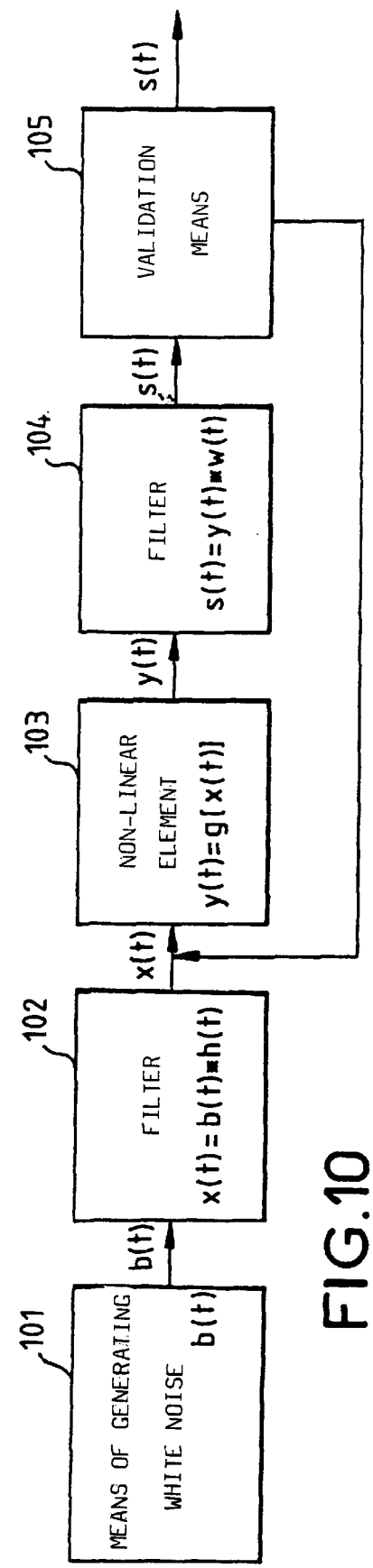

FIG. 10, an example embodiment of a device for the use of a process according to the invention.

FIG. 1 illustrates the possible steps in a process according to the invention. This process is composed in particular of a sequence of steps or signal processing operations, including possible repetition of some of the operations in order to make the parameters of the random signal converge towards the desired laws. These parameters are the parameters mentioned above, in other words the spectrum and the amplitudes histogram.

The process according to the invention comprises a first step 1 in which a noise b(t) is generated. For example, this could be white noise, in other words noise with a white spectrum, and with a histogram of equiprobable amplitudes. For example, this noise b(t) may be produced by a pseudo-random generator like that described in the article entitled <<Generation of pseudo-random sequences for spread spectrum systems>> by R. Moser and J. Stover published in Microwave Journal May 1995. The noise generated in the first step is not necessarily white, and may for example be colored noise. The advantage of white noise is that it is relatively simple to generate.

In a second step 2 of the process according to the invention, noise b(t) is filtered in order to obtain a signal x(t) with the given spectral envelope, this spectral envelope being defined by the function H(f), where f is the frequency. For example, this may be obtained by passing the noise b(t) in a filter which uses the function h(t) equal to the inverse Fourier transform of the previously defined function H(f), as the pulse response. Therefore the signal x(t) obtained at the output from this second step 2 also has the right spectral envelope but its amplitudes histogram is close to a Gaussian law. However, this law is not wanted, in particular because it prevents the generated random signal from efficiently eliminating the effect of converter non-linearities, as was mentioned before. A rectangular or almost rectangular law is more efficient in this respect.

For example, if the noise b(t) is not white, the response of the filter in step 2 must be modified accordingly. The role of the filter remains the same, particularly to obtain a spectral envelope equal to H(f) at the output from step 2.

In the third step 3 of the process according to the invention, the signal x(t) created in the previous step enters into a non-linear element described by its non-linear transfer function y=g(x). Therefore, a signal y(t)=g[x(t)] is obtained at the output from this third step 3. The non-linear function g is not arbitrary, it is defined such that the signal y(t) is close to the required amplitudes histogram, this histogram being defined by a function of y, denoted f(y). For example, this histogram will subsequently be considered as being rectangular, or almost rectangular.

FIG. 2a illustrates the expression of the function g of the third step. This function g is defined firstly from the histogram 21 of x(t), the function of which is denoted P(x), and secondly the required histogram 22 for y(t), namely f(y). The function g is then defined according to the following relation:

$$y = g(x) = \alpha \int_0^x \frac{P(u)}{f(u)} du \qquad (1)$$

α is a factor for adjustment of the amplitude depending on the required amplitude for the signal y(t).

This relation (1) shows that the function g that is applied to x(t) actually depends on this variable x(t) since it depends on its histogram P.

For example, the histogram P(x) is obtained as follows:
intervals with equal widths are defined on the scale of amplitudes of x(t);
a box in the histogram is associated with each interval;
the population of a box is increased by one unit every time that the amplitude of x(t) is included in the interval corresponding to this box.

FIG. 2b illustrates one possible shape of the histogram P(x) of the function x(t), at the output from the second step. This histogram is shown by vertical lines 29 each associated with one box 28 of the histogram. The amplitude of a line corresponds to the population in a box. The ordinates line represents the values of the histogram P(x) as a function of the amplitudes A of the function x(t) represented on the abscissas line. The histogram P(x) has an approximately Gaussian shape, for example centered on a value $x_0$ of the function x(t).

FIG. 2c represents a curve 27 showing one possible shape of the non-linear function g, the centerline of the ordinates representing the values g(x) of the function and the centerline of the abscissas representing the values of the amplitudes of x(t). The function g is approximately linear close to the above mentioned central value $x_0$. Therefore, these values are hardly affected by the function g, except possibly by a factor. On the other hand, values further away are transformed by a larger amount, in particular to make the histogram P(x) closer to a square shape. FIG. 2d thus illustrates the role of the non-linear function g. This figure illustrates the shape of the signal histogram after the fourth step 4, clearly showing that this histogram is close to a square shape. We will return to this FIG. 2d later when considering the output signal from the next step, and possible loopbacks to the third step 3 and the fourth step 4.

For example, application of function g may be followed and/or preceded by a smoothing function 23. This smoothing function may in particular be used to eliminate small insignificant ripples, for example small ripples 30 like those in the histogram P(x) illustrated in FIG. 2b. For example, smoothing may be done by a Fourier transform, then by suitable weighting and finally by an inverse Fourier transform. Note that the integral contained in function g as defined by relation (1) performs smoothing, or almost performs smoothing. If this smoothing is sufficient, it may not be necessary to perform additional smoothing.

The signal y(t) at the output from the third step 3 actually has the required histogram f(y), but no longer has the required spectral envelope H(f) since the consequence of passing through the non-linear function was to enrich the spectrum. The spectrum of y(t) then occupies a wider frequency band than the spectrum defined by the function H(f), and also introduces deformations from this function H(f).

A fourth step 4 of the process according to the invention is used to correct the spectral envelope of y(t). This signal y(t) passes through a pulse response filter w(t) for this purpose.

FIG. 3 illustrates a method of obtaining this filter w(t) starting from y(t) and H(f), that is the spectral envelope 34 to be obtained. The Fourier transform of y(t) is calculated by calculation means 31 that produce a frequency function f, Y(2πjf) at the output. Means 32 are used to calculate the modulus of this Fourier transform and thus obtain the modulus |Y(2πjf)|, denoted $Y_2(f)$. For example, these same means may be used to calculate a smoothing to be applied to this function |Y(2πjf)|. As in the third step 3, smoothing may be used to eliminate small insignificant ripples. Calculation means 33 subsequently divide H(f) by $Y_2(f)$, to give $H(f)/Y_2(f)$. For example, the result of this division may be multiplied by a factor β that can give the right required time values. In particular, this factor β may be used to define the amplitude of the output signal s(t) mentioned later. For example, this multiplication may be done for this purpose in the time domain after application of an inverse Fourier transform. The result of the division $H(f)/Y_2(f)$ is a function W(f), for which the inverse Fourier transform is determined by calculation means 35, the result of this inverse Fourier transform being the function w(t) that is the required pulse response. This pulse response that is combined with the filter input signal y(t) by a convolution product depends on this input signal y(t). Note that the multiplication by the factor β may be done for example after the division by calculation means 33.

Therefore in the fourth step 4 of the process according to the invention, the signal y(t) output from the third step passes into a pulse response filter w(t), that produces a result s(t) that has the required spectral envelope and an amplitudes histogram that tends towards the required function f. It is then possible to repeat step 3 so as to obtain the best approximation of the histogram, and actually to refine the convergence towards the histogram f. FIG. 4 illustrates an example in which the third step is performed three times and the fourth step is repeated twice. Thus, at the output from the fourth step 4 that includes a pulse response filter w(t), the signal s(t) is once again passed through the third step 3a with a non-linear transfer function g2 different from the previous function g. This non-linear function g2 is illustrated by curve 27' in FIG. 2e. This function is defined from histogram P(x) illustrated in FIG. 2d, which is the histogram of the output signal s(t) from the fourth step, and also the input signal for the repeated third step 3a. Since this histogram is closer to a square than the previous histogram as illustrated in FIG. 2b, function g2 is closer to a linear function compared with the previous non-linear function, illustrated in FIG. 2c. The histogram of the output signal from the repeated fourth step 4a is illustrated in FIG. 2f. This figure shows a histogram P(x) that is approximately a square or a rectangle. This signal may then be considered as being acceptable for a given application.

Possibly, and if necessary, the signal can then be processed again by the third step 3b. The non-linear function g and filtering w(t) are different in each repetition since the non-linearity of the non-linear function decreases and the correction to the spectral envelope becomes smaller due to the fact that the spectral envelope and the amplitudes histogram converge towards the required laws as the repetitions are continued. In particular, the number of repetitions of the third and fourth steps depend on the precision with which it is desired to approach the histogram and the spectral envelope. A histogram shape like that illustrated in FIG. 2f can thus be quite acceptable.

For example, the repetition may be done by looping the output signal s(t) from the fourth step back to the input of the third step as illustrated in loop 5 in FIG. 1. A new non-linear function g, and a new pulse response w(t), are recalculated in each increment in the loop. The number of repetitions of the loop may be defined according to different criteria, for example:

the number of repetitions is counted, and the signal s(t) is considered as being final and repetitions are stopped when the number of repetitions reaches a given number;

a convergence criterion may also be used, for example being based on the difference between the resulting laws and the required laws.

FIG. 5 illustrates application of the process according to the invention to a digital-analog conversion system, for example contained in a digital synthesizer. In this application, a digital useful signal x(t) must be converted into an analog magnitude with the best possible linearity, in other words with as few parasite signals as possible. Therefore, this useful signal x(t) is added to a random signal s(t) obtained by the process according to the invention using generation means 54, for example like those described below. The two signals x(t) and s(t) are combined by an adder 51. These two signals are digital. In one preferred embodiment of the conversion system, the random system s(t) has the following characteristics:

an amplitude similar to or greater than the signal amplitude x(t);

a histogram similar to the equiprobable law with an almost rectangular shape, preferably with edges following laws with continuous derivatives;

a spectral envelope with limited bandwidth, for example this envelope being rectangular.

FIGS. 6a and 6b illustrate the first two of these characteristics. FIG. 6a shows a first curve 61 in which the ordinate represents the probability P that the noise amplitude is included within a given interval [A, A+dA]. Consequently, the ordinate represents the probability P and the abscissa represents the noise amplitude. The noise amplitude is between a value $A_{min}$ and a value $A_{max}$ defining an interval $[A_{min}, A_{max}]$. These values are approximately equal to or close to the minimum and maximum amplitudes of a useful signal, also represented by a curve 62 shown in FIG. 6b, varying between the values $A_{min}$ and $A_{max}$. The probability P of the noise is approximately constant over the interval between the values $A_{min}$ and $A_{max}$. Therefore the noise probability density is approximately equal to an equiprobable density law. Note that the useful signal is represented as being sinusoidal in FIG. 6b, but obviously other useful signal shapes would be possible.

The result of the addition x(t)+s(t) by the adder 51 is supported by an N bit bus, the useful signal x(t) and the random signal s(t) being coded on (N−1) bits. Truncation means 52 reduce this result from N bits to M bits, where M is less than N. The result coded on M bits is converted into an analog magnitude by a digital-analog converter 53. If there is no random signal, the transfer of the useful signal through converter 53 creates parasite signals particularly due to the non-linearities of the converter. Non-linearities denote the fact that not all steps in the digital-analog converter transfer function are the same height, and the transition between steps produces irregular phenomena. These non-linearities result in the generation of harmonic signals that are also folded due to sampling. Parasite signals are thus created, a parasite signal being composed of frequencies different from the frequencies making up the useful signal. In particular, the characteristics of the random signal s(t) prevent the energy corresponding to the non-linearity from being organized in discrete rays. Consequently, the non-linearity energy is spread into a noise floor.

The truncation operation also generates parasite signals folded by sampling. Since parasite signals due to non-linearities are reduced to a noise floor, it may also be necessary to solve the truncation problem. FIG. 7 is a mimic diagram showing an embodiment of a digital-analog conversion system in which a sigma-delta modulator is used to eliminate the truncation error due to converting the useful signal x(t) from N bits to M bits. For example, truncation is done at the output from the adder 51 that summates the useful signal x(t) and the random signal s(t), these two signals each being coded on (N−1) bits. Obviously, if there are any non-linearities, there is no point in attempting to eliminate truncation errors, since the parasite truncation signals remain imperceptible in the other parasite signals, particularly signals caused by non-linearities. But, as soon as injection of a random signal s(t) as described above can eliminate the non-linearities, it becomes advantageous to add a sigma-delta modulator as described below into a device according to the invention, in order to eliminate parasite truncation signals.

The system still comprises means 54 for generating the random signal and a digital-analog converter 53 at the output. The means of generating random signals 54 use the process according to the invention, for example as described below. Defects due to non-linearities of the analog-digital converter 53 are processed by these generation means 54. The result of adding the useful signal x(t) and the random signal s(t) is coded on N bits, and for example the amplitude of the signal x(t)+s(t) is chosen to avoid overflows during an addition 73 that will be described later. The N-bit bus at the output from the adder 51 is divided into two parts. A first bus comprising the M high order bits is input into a delay module 71. A second bus comprising the N−M low order bits is input into the sigma-delta modulator 72. The delay module 51 compensates for the delay introduced by the sigma-delta modulator for treatment of the N−M low order bits. The output from the sigma-delta modulator 72 is added to the output from the delay module 71 by a second adder 73. The result of the addition coded on M bits is converted into an analog signal by the digital-analog converter 53. In particular, the signal is coded on M bits.

FIG. 8 shows another possible embodiment of the digital-analog conversion system. Two sigma-delta modulators are used in this embodiment. The first 72 solves the truncation problem for the useful signal x(t). The second solves the truncation problem for the random system s(t). This arrangement is advantageous in that in many cases the second modulator 82 can either be eliminated since the effect of truncation of the random signal can be neglected, or integrated into the process for generation of the random signal s(t). The result is a saving of equipment. In many cases, truncation of the random signal may be neglected since the spectrum associated with this truncation is very much lower than the spectrum related to truncation of the useful signal. This is due to the fact that the energies of the random signal and the useful signal are similar. In the case of the random signal, this energy is distributed on a large number of spectral components, therefore each of which is at a level very much lower than the spectral component related to the useful signal. Therefore if these two signals have the same energy, the amplitude of the rays in the random signal is much lower than the amplitude of the rays in the useful signal. The truncation of the random signal can then be neglected.

Therefore, in this embodiment shown in FIG. 8, the two sigma-delta modulators 72, 82 are used to independently eliminate truncation errors on the useful signal x(t) and truncation errors on the random signal s(t) before these two signals are added, the useful signal and the noise signal being truncated before this addition. Since the useful signal was coded on N bits, its bus is divided into two parts. A first bus comprising the M high order bits is input into the first delay module 71. A second bus comprising the N−M low order bits is input into the first sigma-delta modulator 72. The delay module 71 compensates the delay introduced by the sigma-delta modulator for processing of the N−M low order bits. The output from the sigma-delta modulator 72 is added to the output from the delay module 71 by a first adder 73. Similarly, the signal output by random signal generation means 54 is coded on N bits, consequently the output bus from these means is divided into two parts. A first bus comprising the M high order bits of the noise signal is input into a second delay module 81. A second bus comprising the N−M low order bits of the useful signal is input into the second sigma-delta modulator 82. The delay module 81 compensates the delay introduced by the sigma-delta modulator for processing of the N−M low order bits. The output from the second sigma-delta modulator 82 is added to the output of the second delay module 81 by a second adder 83. The result of the additions at the output from the first and second adders 73, 83, coded on M bits, is added by a third adder 84. The result of the addition supplied by the third adder and coded for example on M+1 bits is converted into an analog signal by the digital-analog converter 53. In this arrangement, the amplitude of the useful signal and of the noise signal have to be chosen such that the additions 73, 83 do not generate overflows. As already mentioned, one advantage of the embodiment according to FIG. 8 is particularly due to the fact that it enables a saving in terms of equipment if the random signal is generated by calculation and for example is saved in a read only memory. In particular, this can save equipment necessary for the second sigma-delta modulator 82, the delay module 81 and the adder 83, since the action of this assembly is integrated in the calculation means.

In the embodiments of a conversion system according to FIGS. 5, 7 or 8, the analog signal is filtered by a filter (not shown) at the output from the digital-analog converter, in order to eliminate the part due to the random signal, from the converted signal. This filtering of the random signal is particularly easy if the signal is perfectly located and does not encroach on the useful signals band.

FIG. 9 presents an example application of a process according to the invention for an analog-digital conversion system. In this case, the useful signal x(t) and the random signal s(t) are analog signals. These two signals are added by an analog adder 91. The sum signal x(t)+s(t) is present at the input to an analog-digital converter 92, the output of which may for example be coded on N bits. The random signal may for example have the same characteristics as the signal described in FIG. 6.

Several solutions may be envisaged concerning a device for embodiment of the process according to the invention. A computer simulation may be used to calculate the remaining transformations to be applied to a noise b(t), for example a white noise, to obtain the required random signal s(t). This computer actually executes the various steps 1, 2, 3, 4 in the process according to the invention, possibly repeating the third step 3 and the fourth step 4 one or several times to obtain a sequence of samples according to a predetermined spectral envelope H(f) and a predetermined histogram f. For example, this sequence of samples may be implanted in a memory that may be read cyclically or otherwise, for example by a microprocessor. The addresses of samples in memory are then used to read the value of these samples and generate the random signal. If several random signals are envisaged, the memory may for example contain several different sequences of samples.

FIG. 10 shows a block diagram illustrating another possible example embodiment for implementation of the process according to the invention. It comprises means 101 for generating noise, for example equiprobable white noise b(t). For example, these means may be composed of a pseudo-random generator. The output from these means 101 is connected to the input of a filter 102 that has a pulse response given by a function h(t) equal to the Fourier transform of the function H(f) that is the spectral envelope to be obtained. The noise b(t) is thus filtered by this filter 102. The output from this filter is connected to the input of a non-linear element 103. In particular, this element comprises calculation means that apply the relation (1) to the signal x at its input in order to obtain the signal y defined by this relation and illustrated in FIG. 2. For example, these calculation means are based on signal processing processors. For example, the non-linear element 103 comprises a memory containing the histogram f(y) to be obtained and one or several factors α that depend on the signal y(t) to be obtained. Finally, it comprises means of creating the histogram P(x) from the input signal x(t). For example, these means may be based on a microprocessor and RAM that may or may not be integrated into the processor. The output from the non-linear element 103 is connected to the input of a second filter 104 with a pulse response w(t) as defined with reference to FIG. 3. This filter comprises calculation means that make the Fourier transform 32 of the signal y(t) at its input and then calculate the modulus and for example do the smoothing and normalization of the spectral signal obtained to output the signal $Y_2(f)$. The filter calculation means 104 also divide H(f) by $Y_2(f)$, where H(f) is the spectral envelope to be obtained for the random signal. For example, this is achieved by the filter 104 comprising a memory that contains this envelope, thus for example the factor β to define the amplitude of the output signal s(t). The filter 104 also comprises means of creating the inverse Fourier transform that are applied to the result of the division $H(f)/Y_2(f)$ to give the pulse signal w(t), when multiplied by a factor β. The output signal s(t) from the second filter 104 represents the random signal. However, as already explained, iterations in the third and fourth steps of the process according to the invention may be necessary to obtain a random signal that satisfies the fixed criteria concerning the spectral envelope of this signal and the histogram of its amplitudes. Consequently, the output from the second filter 104 is connected to the input of means 105 for validation of the random signal generated by the device according to the invention. Validation criteria are memorized for this purpose in means 105. As long as the signal s(t) at the output from the second filter 104 does not satisfy these criteria, the validation means 105 reroute the signal s(t) as an input to the non-linear element 103. Consequently, an output from validation means 105 is connected to the input of the non-linear element. When the signal s(t) satisfies the validation criteria, it is transferred to a second output from the validation means 105, this output producing the random signal. Several criteria may be envisaged, as was described previously.

If a selected criterion is the number of repetitions of signal processing through the non-linear element 103 and the second filter 104, the validation means 105 may for example include a counter that determines the number of times that the signal s(t) has been sent to the non-linear element 103. When the counter indicates the determined number of iterations, the validation means 105 switch the signal s(t) to their second output. For example, switching may be done using digital switches, through or not through a microprocessor.

If a convergence criterion is selected, the validation means 105 may for example include a digital or analog comparator that compares the histogram and the spectrum of the signal s(t) with histograms and spectra of memorized reference signals $s_0(t)$. When the result of this comparison is within a predetermined and memorized range that satisfies the convergence criterion, the validation means 105 switch the signal s(t) to the second output to output the random signal.

The device according to the invention as described with respect to FIG. 10 may for example be used as a means of generating a random signal 54 in the digital-analog conversion systems with relation to FIGS. 5, 7 and 8. In the case of an analog-digital conversion system and for FIG. 9, a digital-analog converter may be added at the output from the device, more precisely at the output from the validation means 105 to output an analog random signal.

When creating an analog random signal, the different steps may also be performed by analog means. In particular, functions to be performed are calculated in advance by simulation means and are then performed by analog circuits based particularly on capacitors, inductances, operational amplifiers and diodes, in a conventional manner. If steps 3 and 4 need to be repeated several times, the functions are calculated in advance for each of the steps to be performed, for example for each of steps 1, 2, 3, 4, 3a, 4a as illustrated in FIG. 4. Each precalculated function is then executed by analog circuits in which a signal is passed in sequence.

The applications of the invention described above relate to digital-analog or analog-digital conversion applications. Nevertheless, the invention may be applied for many other applications that use a random signal for which the spectral envelope and the amplitudes histogram are to be fixed at the same time. Furthermore, the invention is economic and easy to implement. For a given application, for example a digital synthesizer, it requires no or few additional components to the extent that all functions of the invention may be performed by circuits already used for the application, such as standard processors or signal processing processors, memories or interfaces. The embodiment may then be essentially software.

What is claimed is:

1. Process for the generation of a random signal, comprising:

a first noise generation step;

a second noise filtering step to obtain a signal x(t) with a predetermined spectral envelope H(f);

a third step in which a non-linear function g is applied to the signal x(t) in order to give a signal y(t) similar to a predetermined amplitudes histogram f(y), the function g being defined by the following relation:

$$y = g(x) = \alpha \int_0^x \frac{P(u)}{f(u)} du$$

where the function P is the histogram of the signal x(t) to which the third step is applied and α is an amplitude adjustment factor that depends on the required amplitude for the signal y(t);

a fourth step in which a pulse response filter w(t) is applied to the signal y(t) to correct its spectral envelope and obtain an output signal s(t) with a predetermined spectral envelope H(f), the pulse response w(t) being an inverse Fourier transform of a frequency function W obtained by dividing the function H(f) by the modulus $Y_2(f)$ of the Fourier transform of the signal y(t), and then multiplying by a constant $\beta$.

2. Process according to claim 1, wherein the third and fourth steps are applied to the output signal s(t) several times to refine convergence towards the predetermined histogram and spectral envelope.

3. Process according to claim 1, wherein the predetermined histogram is rectangular and the spectral envelope has a limited band.

4. Process according to claim 1, wherein the predetermined histogram is almost rectangular and the spectral envelope has a limited band.

5. Process according to claim 4, wherein edges of the histogram have continuous derivatives.

6. Process according to claim 1, wherein the noise in the first step is white noise.

7. Process according to claim 1, wherein in the third step, application of the function g is at least one of followed and preceded by a smoothing function.

8. Process according to claim 1, wherein in the fourth step, the module $Y_2(f)$ is normalized.

9. Process according to claim 1, wherein smoothing is applied to module $Y_2(f)$ in the fourth step.

10. Device for an embodiment of the process according to claim 1, further comprising at least one computer and a memory, the computer executing the steps in the process by simulation to define a sequence of samples with a predetermined spectral envelope H(f) and histogram f, the samples being stored in the memory.

11. Device for an embodiment of the process according to claim 1, further comprising:
noise generation means;
a filter connected to the output of the noise generation means, with a pulse response defined by the function h(t) equal to the Fourier transform of the function H(f) that is the spectral envelope to be obtained;
a non-linear element connected to the filter output, comprising calculation means for applying the function g defined as follows to the signal x(t) present at its input:

$$y = g(x) = \alpha \int_0^x \frac{P(u)}{f(u)} du$$

the non-linear element storing a predetermined histogram f(x) and the factor $\alpha$ in memory, and comprising means for calculating the histogram P(x) of the signal x(t) present at its input;
a second filter, connected to the output from the non-linear element with a pulse response w(t), the second filter comprising calculation means that make the Fourier transform of the signal y(t) present at its input and then calculate the modulus of the spectral signal obtained to output the signal $Y_2(f)$, the filter calculation means also dividing H(f) by $Y_2(t)$, the device comprising means of memorizing H(f) and a factor $\beta$, the filter also comprising inverse Fourier transform means that are applied to the result of the division $H(f)/Y_2(f)$ that can be multiplied by the factor $\beta$ to give the pulse signal w(t), the output signal s(t) from the second filter being the random signal.

12. Device according to claim 11, wherein the output from the second filter comprises means of validating the random signal s(t), validation criteria being memorized in these means, and in that the validation means transfer the signal s(t) to the input to the non-linear element through an output connected to the input of this non-linear element, until the signal s(t) at the output from the second filter satisfies the validation criteria.

13. Device according to claim 12, wherein if a number of repetitions of signal processing through the non-linear element and the second filter is selected as a criterion, the validation means comprise a counter that determines a number of times that the signal s(t) is rerouted to the non-linear element.

14. Device according to claim 12, wherein if a convergence criterion is selected, the validation means comprise a comparator that compares the histogram and the signal spectrum s(t) with respect to a memorized histogram and a reference spectrum $s_0(t)$.

15. Digital-analog conversion system using a random signal s(t) generated by the process according to claim 1, wherein a useful digital signal coded on (N−1) bits, may be converted into an analog signal, and comprises:
an adder, adding the random signal s(t) coded on (N−1) bits to the useful signal, the result of the addition coded on N bits being truncated to M bits.

16. System according to claim 15, further comprising:
at the output from the first adder, a first bus comprising the M high order bits input into a delay module;
at the output from the first adder, a second bus comprising the N−M low order bits input into a sigma-delta modulator, the delay module compensating for the delay introduced by the sigma-delta modulator for the treatment of N−M low order bits, the output from the sigma-delta modulator being added to the output of the delay module by a second adder, the result of the addition coded on M bits being converted into an analog signal by a digital-analog converter.

17. Digital-analog conversion system using a random signal s(t) generated by the process according to claim 1, wherein a useful digital signal is to be converted into an analog signal, the useful signal and the random signal are coded on N bits being truncated to M bits, and it comprises two sigma-delta modulators, the useful signal bus being divided into two parts:
a first bus comprising the M high order bits input into a first delay module;
a second bus comprising the N−M low order bits input into the first sigma-delta modulator, the delay module compensating for the delay input by the sigma-delta modulator for the processing of N−M low order bits, the output from the sigma-delta modulator being added to the output of the delay module by a first adder;
a first bus comprising the M high order bits of the random signal s(t) input into a second delay module, the bus of this signal being divided into two parts;
a second bus comprising the N−M low order bits of the useful signal input into the second sigma-delta modulator, the second delay module compensating for the delay input by the sigma-delta modulator for processing of the N−M low order bits, the output from the second sigma-delta modulator being added to the output from the second delay module by a second adder;
the results of the additions at the output from the first and second adders being added by a third adder, the result of the addition produced by this adder coded on M+1 bits being converted into an analog signal by a digital-analog converter.

18. System according to claim 15, wherein it forms a digital synthesizer.

* * * * *